United States Patent [19]

Weber

[11] 4,138,779
[45] Feb. 13, 1979

[54] PROCESS AND DEVICE FOR MOUNTING A FASTENING ELEMENT TO A COMPOSITE PANEL

[75] Inventor: Alfred Weber, Schaffhausen, Switzerland

[73] Assignee: Swiss Aluminium Ltd., Chippis, Switzerland

[21] Appl. No.: 808,783

[22] Filed: Jun. 22, 1977

[30] Foreign Application Priority Data

Jul. 6, 1976 [CH] Switzerland .................... 8626/76

[51] Int. Cl.² ........................................... B23P 11/00
[52] U.S. Cl. ................................. 29/432.1; 85/68; 29/243.52
[58] Field of Search ..................... 29/432.1, 243.52; 151/41.74; 85/68, 79, 73–76

[56] References Cited

U.S. PATENT DOCUMENTS

| | | | |
|---|---|---|---|
| 3,164,283 | 1/1965 | Olson | 29/243.52 |
| 3,232,162 | 2/1966 | Ketchum | 29/243.52 X |
| 3,476,164 | 11/1969 | Voullaire | 151/41.74 |
| 3,906,832 | 9/1975 | Lunn | 85/68 X |

*Primary Examiner*—Leon Gilden
*Attorney, Agent, or Firm*—Robert H. Bachman

[57] ABSTRACT

A process and device are described by which means fastening elements are mounted onto one side of a composite panel. The rigid fastening element has an expandable claw at its head which is placed in a recess in the composite panel by using a conventional rivet gun for dummy rivets, fitted with a special accessory; the fastening element, which may be in the form of a bolt with a countersunk head, is drawn back and the expandable claw prevented from moving with it, whereupon the claw opens out and is anchored firmly in the core of the composite panel.

11 Claims, 3 Drawing Figures

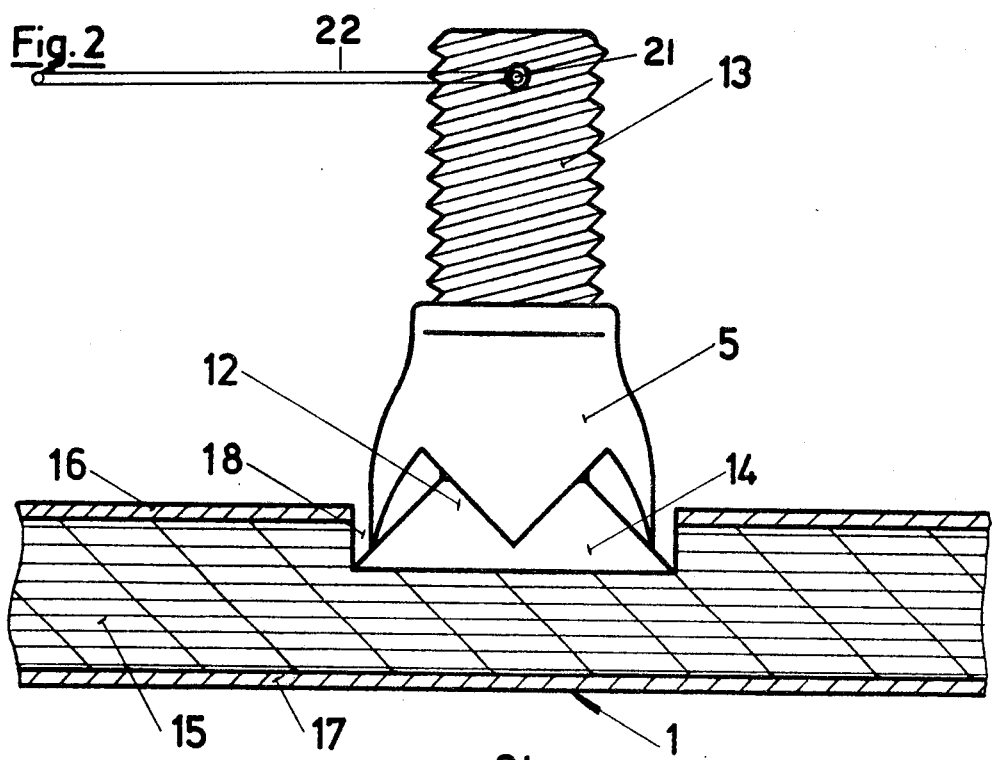
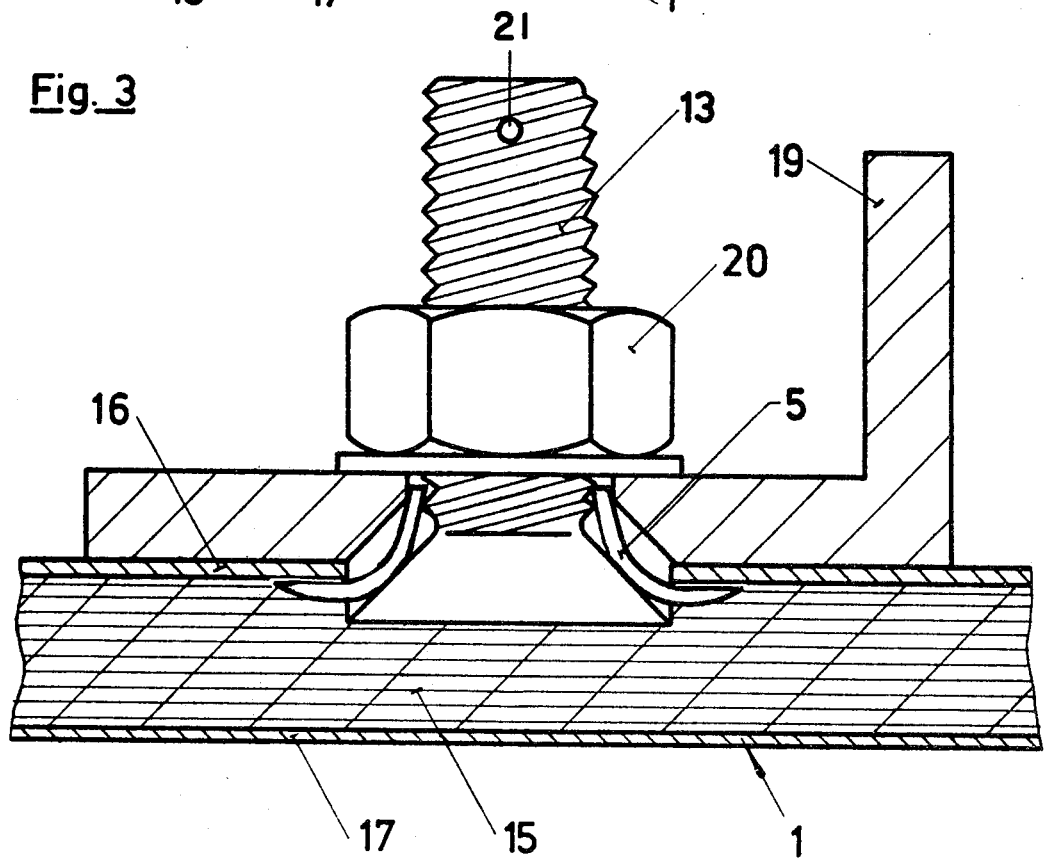

PROCESS AND DEVICE FOR MOUNTING A FASTENING ELEMENT TO A COMPOSITE PANEL

BACKGROUND OF THE INVENTION

The invention relates to a process and a device for mounting fastening elements to one side of a composite panel, in particular to a panel which has a core layer and two metallic outer layers.

A number of fastening elements which can be fixed to one side of relatively thin sheets of wood or composite panels are already known, but have the disadvantage that they do not ensure a flawless appearance, because either relatively high pressure has to be applied locally to mount the fixture, thus producing an irregularity on the outer surface, or else the fastening element can be mounted only by uneconomic means.

SUMMARY OF THE INVENTION

The object of the invention presented here is to develop a process and a device for mounting fastening elements to one side of a composite panel, in particular to a composite panel which has a core layer and two metallic outer layers, by means of which process and device the above mentioned disadvantages associated with known fastening elements for composite panels are avoided.

The object of the present invention is achieved by way of a process in which at least one rigid fastening element which is suitable for mounting the composite panel on another object, and which has at its head a metallic expandable claw, or shell terminating in prongs is anchored in a recess of the panel in such a way that the fastening element is pulled back and the expanding claw is prevented from moving with the fastening element.

The device for carrying out the described process is such that a conventional, pneumatically powered dummy rivet gun, provided for anchoring the metallic expandable claw to the composite panel, is fitted with a special accessory which grips and draws back the rigid fastening element with respect to the expandable claw, and prevents the expandable claw from moving with the fastening element during the drawing-back operation.

BRIEF DESCRIPTION OF THE DRAWING

The drawing shows, in a simplified, schematic manner an exemplified embodiment of the invention viz.

FIG. 2 shows rigid fastening element for holding a panel in place, set into a recess in the composite panel, and fitted with an expandable claw; and FIG. 3 shows a section through a composite panel, and a support member of angle iron joined together by means of the fastening element and expanding claw shown in FIG. 2.

DESCRIPTION OF THE PREFERRED EMBODIMENTS

Figure 1:
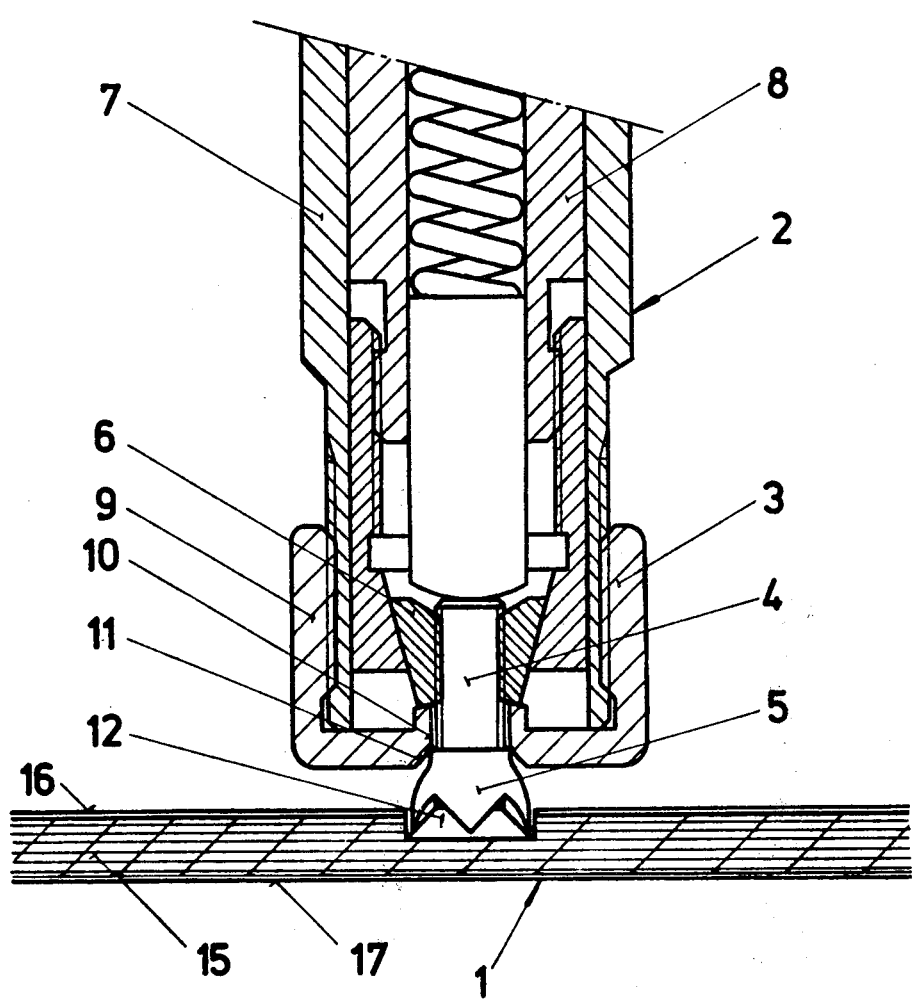
FIG. 1 shows a device for mounting the fastening element to a composite panel.

As shown in FIGS. 1-3, the device for mounting fastening elements to one side of a composite panel 1 comprises a conventional, pneumatically powered dummy rivet gun 2 fitted with a special accessory 3 for pushing a rigid fastening element 4 with respect to an expandable claw 5, in one direction and for restraining the expandable claw 5 from being pulled in the opposite direction, or moving back with the fastening element 4, during the pulling operation.

The accessory 3 has clamping jaws 6 which are joined to a piston 8, which can move up and down in a cylindrical housing 7 of the riviting gun 2, the function of the clamping jaws 6 being to grip the rigid fastening element 4. At the lower end of the accessory 3 there is disposed a cap 9, which is screwed on to the housing 7, and has a hole 10, through which the fastening element 4 is passed and held by the clamping jaws 6. The outer rim of the cap 9 defining the hole 10 acts as a stop 11 for the expanding claw 5 disposed on the rigid fastening element 4.

The rigid fastening element 4 has at one end a sloping bearing surface 12 for the expandable claw 5. In the exemplified embodiment shown in FIGS. 1-3 the rigid fastening element 4 is a bolt 13 having a countersunk head 14. It is also within the scope of the invention for the rigid fastening element 4 to be implemented for example in the form of a simple kind of screw (not described in any greater detail here) with a nut threadable thereonto, the screw having a sloping bearing surface for the expandable claw 5. At one end of the fastening element 4 or screw there could also be provided, for example a hole 21, into which a support rod 22 projecting out of a wall fits, and by which means the composite panel 1 is held in place.

The relatively thin composite panel 1 shown in FIGS. 1-3 has a core 15 which is preferably made of plastic, and bonded on both sides to metal cover sheets 16 and 17 made, for example, of an aluminum alloy. On one side of the composite panel 1 there is a recess 18, which has been drilled into the panel 1, for example, passing through the cover sheet 16 and extending into the core 15 to a pre-determined depth in accordance with the dimensions of the expandable claw 5. As far as the structure of the composite panel 1 is concerned, it may also be made (in a manner not described in greater detail here) of a plurality of layers of wood if desired. It can be seen from the exemplified embodiment shown in FIG. 3, how the expandable claw 5 is embedded and anchored in the core 15 of the composite panel 1 with the help of the special accessory 3 disposed on the dummy rivet gun 2, and secured to a piece of angle iron 19 by means of a nut 20 screwed onto the bolt 13.

In order to mount the rigid fastening element 4 to the composite panel 1, the element 4 having an expandable claw 5 provided on it, is first placed in the recess 18. The accessory 3 of the dummy rivet gun 2 is pushed over the fastening element 4 until the stop 11 of the accessory 3 rests on the upper edge of the expandable claw 5. On actuating the rivet gun 2, the clamping jaws 6, which are connected to the piston 8, grip the rigid fastening element 4 and pull it in the direction of the rivet gun 2 during the up-and-down movement of the piston 8, which causes the expandable claw 5 normally resting on the sloping surface 12 of the rigid fastening element 4 to spread out until it occupies the position indicated in FIG. 3, in which the fastening element 4 is anchored to the composite panel 1. On using a fastening element 4 which is in the form of a bolt, the upper rim of the expandable claw 5 advantageously engages with the thread of the bolt during the anchoring process, so that the rivet gun 2 prevents the bolt from turning.

After fixing the fastening element 4 to the composite panel 1 at the desired place, the panel 1 can then be fixed on to a wall in the above described manner.

I claim:

1. In a process for mounting a fastening element onto a panel having an aperture, said fastening element including a shank having a head member of a cross-sectional area exceeding the cross-sectional area of said shank, and a shell member surrounding said shank, and terminating in a plurality of prongs the steps comprising:

clamping said shank of said fastening element;

inserting the head member of said fastening element at least partly into said aperture;

moving at least one member in a direction away from the other member;

expanding concurrently said prongs in a radially outward direction; and engaging said panel with said prongs thereby mounting said fastening element onto said panel.

2. In a process claim as recited in claim 1, wherein said panel includes at least one core layer and two metallic outer layers, one of said outer layers having an inner supporting surface, and wherein said engaging step includes abutting at least a portion of said prongs to said inner supporting surface.

3. A device for mounting a fastening element onto a panel, the panel having an aperture comprising in combination:

a fastening element including a shank having a head member of a cross-sectional area exceeding the cross-sectional area of said shank;

a shell member surrounding the shank and terminating in a plurality of prongs;

means for inserting the head member of said fastening element at least partly into said aperture and moving at least one member in a direction away from the other member so as to expand said prongs in a radially outward direction to engage said panel; and clamping means in contact with said moving means for gripping said fastening element.

4. A device as recited in claim 3, wherein said clamping means has a passage and wherein the inserting and moving means further comprises:

holding means for holding said clamping means; and a housing surrounding said holding means, said holding means being movable within said housing towards and away from said panel, said housing having a hole communicating with said passage, said shank being slidable within said hole, whereby said shell member is restrained from entering said passage during movement of said holding means in a direction away from said panel.

5. A device as recited in claim 3, wherein said clamping means comprises at least two jaws for gripping said shank of said fastening element.

6. A device as recited in claim 3, wherein said fastening element has a tapered head member provided with a sloped bearing surface in abutting relationship with said prongs.

7. A device as recited in claim 3, wherein said fastening element has an aperture in its shank adapted to receive a rod for supporting said panel.

8. A device as recited in claim 3, wherein said panel aperture is a recess extending partly through said panel.

9. A device as recited in claim 8 wherein said panel has at least one core layer and first and second metallic outer layers;

said recess is at least partly defined by said first layer;

said fastening element is at least partly threaded;

a nut is threadable on said fastening element; and at least one plate is interposed between said nut and said panel.

10. A device as recited in claim 4, wherein said holding means comprises a longitudinal piston.

11. A device as recited in claim 4 wherein said housing comprises:

a jacket surrounding said holding means and having at least a partly threaded outer surface; and a cap at least partly internally threaded so as to screw onto said threaded outer surface, said cap being formed with said hole.

* * * * *